United States Patent [19]

Knobel

[11] Patent Number: 4,786,833
[45] Date of Patent: Nov. 22, 1988

[54] CASING FOR AIR COOLED ELECTRIC MACHINES

[75] Inventor: Robert Knobel, Beinwil am See, Switzerland

[73] Assignee: Zschokke Wartmann AG, Dottingen, Switzerland

[21] Appl. No.: 39,102

[22] Filed: Apr. 16, 1987

[30] Foreign Application Priority Data

Apr. 23, 1986 [CH] Switzerland .................. 1675/86

[51] Int. Cl.[4] .......................................... H02K 5/18
[52] U.S. Cl. .................................. 310/89; 165/185; 219/93; 310/58
[58] Field of Search .............. 29/157.3 A, 157.3 B, 29/596; 165/47, 185; 219/91.2, 93; 310/42, 58, 59, 60 A, 64, 89, 91

[56] References Cited

U.S. PATENT DOCUMENTS

| 4,168,795 | 9/1979 | Bennett | 219/93 |
| 4,276,926 | 7/1981 | Evangelow | 165/47 |
| 4,415,824 | 11/1983 | Meier | 310/89 |

FOREIGN PATENT DOCUMENTS

| 1100057 | 2/1961 | Fed. Rep. of Germany | 165/185 |
| 82579 | 7/1956 | Netherlands | 219/93 |

Primary Examiner—Patrick R. Salce
Assistant Examiner—D. L. Rebsch
Attorney, Agent, or Firm—Helfgott & Karas

[57] ABSTRACT

The casing of an electric machine has ribs welded onto a casing jacket, the ribs displaying a U-shaped profile. The legs of the ribs can be secured by resistance projection welding to the casing jacket. One rib can be somewhat larger than the other ribs and used as a support for a foot.

9 Claims, 2 Drawing Sheets

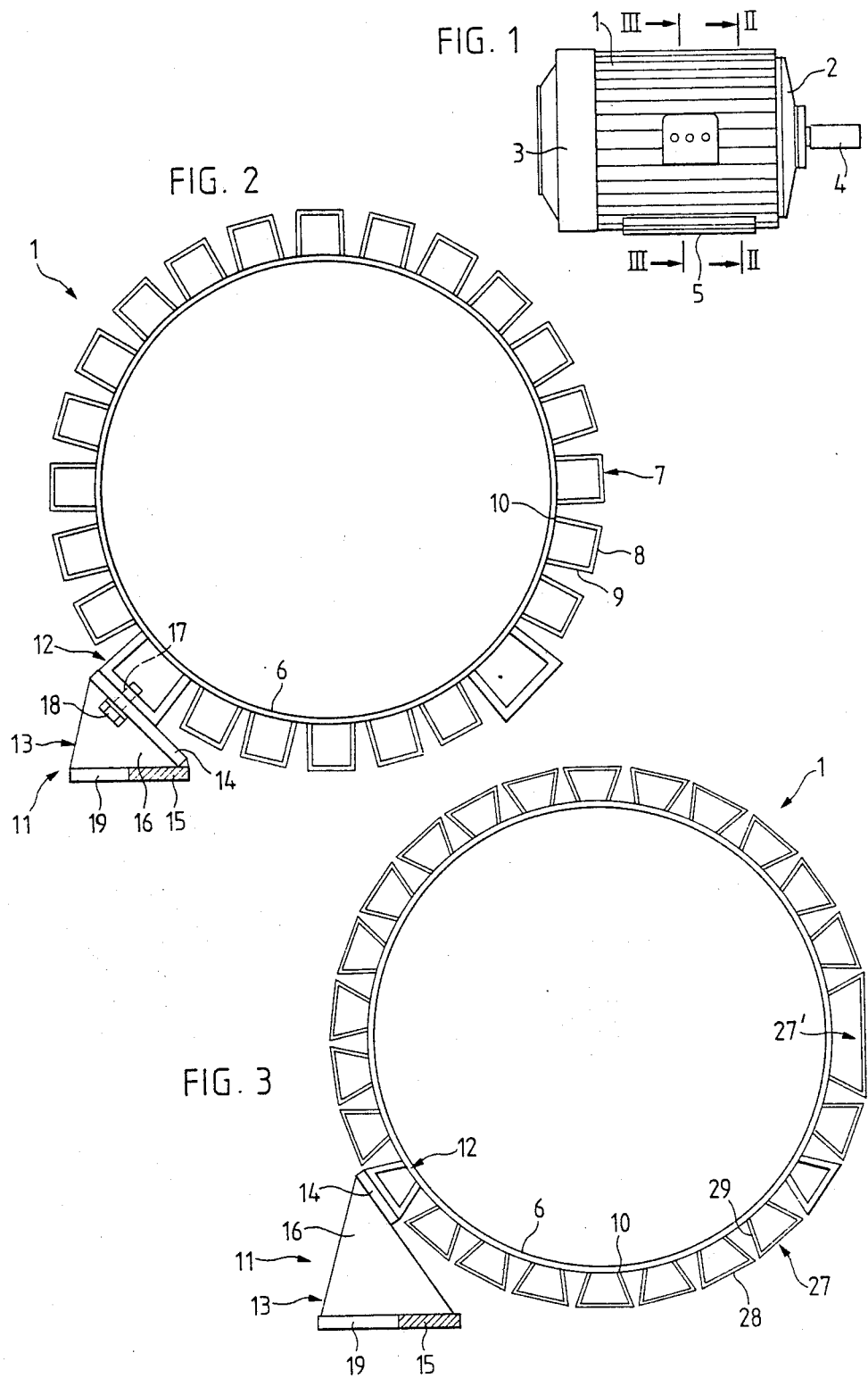

U.S. Patent Nov. 22, 1988 Sheet 2 of 2 4,786,833
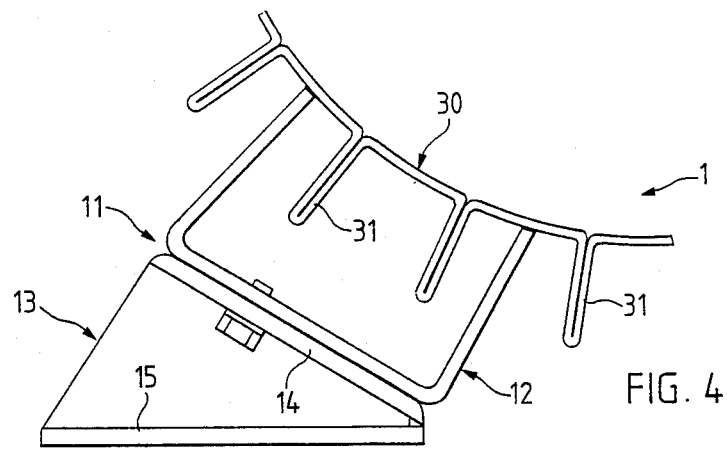
FIG. 4
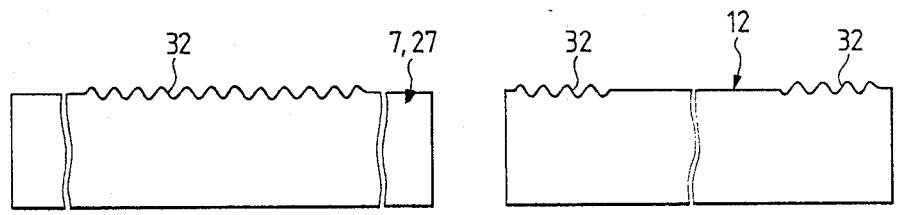
FIG. 5
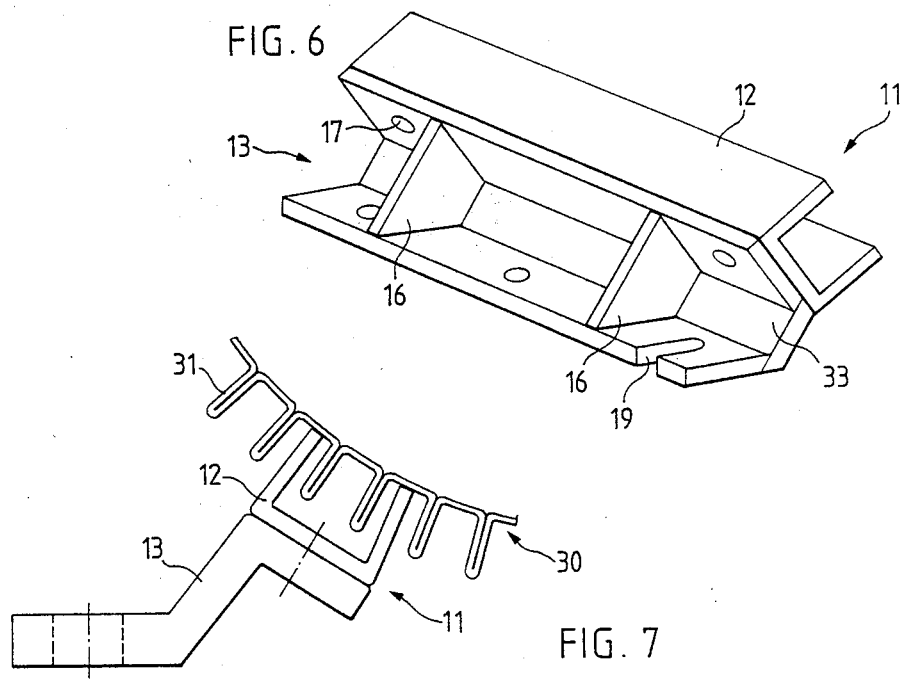
FIG. 6
FIG. 7

CASING FOR AIR COOLED ELECTRIC MACHINES

BACKGROUND OF THE INVENTION

The present invention relates to a device or apparatus used for an electric machine comprising a casing jacket constructed with cooling ribs or fins.

Numerous different electric machine casing constructions are known. Whereas cast iron casings, particularly in low power electric machines are becoming less frequently used, sheet metal casings have enjoyed increasing favor, because such casings have advantages compared with cast casings, e.g. a lower weight, lower manufacturing expenditure, and therefore lower cost.

In the manufacture of sheet metal casings, the sheet metal is unwound from a roll of strip steel and is then pressed in a pleating or folding press to form rib elements, which are then generally shaped into circular casings and welded together at the terminal edges. Such casings are then provided with end flanges and feet or bases, followed by assembly, in the manufacture of electric machines.

However, sheet metal casings have a number of disadvantages. Thus, it is not possible, as in the case of aluminum or cast iron casings, to manufacture the feet and terminal blocks at the time of manufacturing the casing and instead an additional operation is required. The feet are mounted on the ribs and welded to the tips. However, this requires a minimum wall thickness for the ribs, so that they are suitable for the transfer of the forces which occur. The other, unstressed ribs are then overdimensioned.

The purpose of the present invention is to so construct electric machine casings of the aforementioned type, that the disadvantages of the casing formed from sheet steel ribs elements are avoided, and at the same time manufacturing costs are not increased and the heat transfer of the casing is reduced. In addition, the feet or foot parts are to be secured during the same operation as the manufacture of the ribs.

SUMMARY OF THE INVENTION

In accordance with the principles of the invention an electric machine has an elongated metal casing jacket which is hollow and is cylindrically shaped. The casing has an axis which extends in the direction of elongation. The casing has oppositely disposed inner and outer surfaces.

A plurality of spaced apart elongated metal cooling ribs are disposed along the outer surface of the jacket, all of said ribs extending in the axial direction. Each rib in transverse cross section has the shape of a U with a central web extending transversely between two oppositely disposed legs with exposed edges.

Means secure the exposed edges of the legs of all of the ribs to said outer surface, whereby the webs of the ribs are outwardly displaced from the casing jacket.

The ribs and casing jacket are composed of the same metal and the edges of the legs are welded to the outer surface of the casing. The exposed edges of the legs can have spaced apart forwardly extending projection points wherein only the points of the edges are welded to the casing jacket.

The machine has bearing brackets disposed at opposite ends of the casing jacket and the points on the edges of the ribs can be disposed in the vicinity of the brackets. Through the use of projection welding, ribs with projection welding can also be used for fixing the feet or placing the terminal block of the machine.

The aforementioned objects and advantages of the invention as well as other objects and advantages thereof will either be explained or will become apparent to those skilled in the art when this specification is read in conjunction with the accompanying drawings and specific description of preferred embodiments which follow.

BRIEF DESCRIPTION OF THE DRAWINGS

FIG. 1 is a diagrammatically represented side view of an electric machine.

FIG. 2 is a diagrammatically represented partial section along line II—II of FIG. 1.

FIG. 3 is a diagrammatically represented partial section of another embodiment of the casing of the machine.

FIG. 4 is a diagrammatic representation of a casing foot in a casing made from a rib element FIG. 5 is a diagrammatically represented view of two rib sections or profiles with projections for projection welding formed at different points.

FIG. 6 is a diagrammatically represented foot section in a three-dimensional view.

FIG. 7 is a diagrammatically represented section usable as a foot section on a casing for an electric machine.

DETAILED DESCRIPTION OF PREFERRED EMBODIMENTS

The electric machine, e.g. an electric motor shown in FIG. 1 is of known construction for such machines. Thus, it comprises a casing 1 and two bearing brackets 2 (only one being visible). A fan cowl 3 covers an underlying fan for cooling the electric machine. Casing 1 is mounted on a stator, which surrounds a rotor with a shaft 4. The electric machine has two feet or bases 5 (only one being visible), with which the electric machine can be fixed to a substrate.

A construction of casing 1 is shown in FIG. 2 in cross-section. Casing 1 comprises a casing jacket 6 and ribs 7 mounted thereon. Ribs 7 are arranged in such a way that their webs 8 are directed outwards, while the legs 9 connected to webs 8 are directed inwards and are welded by their edge 10 to the casing jacket 6. The jacket and ribs can be composed of the same metal, typically sheet steel.

FIG. 2 also shows that casing 1 is supported on two feet or bases 11 (only one being shown), which are constituted by a base profile 12 and a foot profile 13. Base profile 12 is constructed in the same way as the other rib 7, but is somewhat larger and has a somewhat greater wall thickness. Foot profile 13 comprises two legs 14, 15, which are reinforced by one or more supporting walls 16. The casing-side leg 14 has bores 17 for receiving a screw 18 for screwing the base profile 12 to the foot profile 13. The base-side leg 15 has slots 19 for fixing casing 1 on a not shown substrate.

FIG. 3 shows another embodiment of casing 1. As in the embodiment according to FIG. 2, ribs 27 are mounted on casing jacket 6 and welded thereto. The difference is that the legs 28 of ribs 27 are inclined with respect to one another instead of being parallel, so that a trapezoidal profile is obtained. This makes it possible to reduce the spacing between webs 29, so that more ribs can be arranged on the casing jacket 6. In addition, cooling is better because the air is better guided between two profiles. If according to FIG. 3, a rib with a wider web 27' is used, e.g. to serve as a terminal panel, here again the same number of ribs 27 can be used as in the embodiment according to FIG. 2.

In FIG. 3 foot 11 is constructed in much the same way as in FIG. 2, and the shape of base profile 12 is the same as that of the remaining ribs 27, but has a greater wall thickness. Foot profile 13 is also formed from two legs 14, 15 and supporting walls 16, the casing-side 14 not extending up to the base-side leg 15.

FIG. 4 shows that use can be made of the foot construction according to FIGS. 2 and 3 in the case of a casing 1 comprising a rib jacket 30. For this purpose a base profile 12 constructed as a U-shaped profile is inserted by its legs between ribs 31 of rib jacket 30 and welded. In the same way as in FIG. 2, foot profile 13 can be fixed to base profile 12.

FIG. 5 shows two of the U-shaped ribs 7, 27 or 12, which are provided on the free edge of leg 9 with projections 32 for making the welded joint with casing jacket 6. Two different arrangements are provided. For ribs 12, as shown in the left side of FIG. 5, the projections 32 are spaced and arranged at the end portions of the legs. For ribs 7 and 27, as shown on the right side of FIG. 5, the projections 32 are at the center portion of the legs. It is particularly advantageous to use projection welding in the present case, because as a result of the symmetrical shape of ribs 7, 27, it is possible to exert a uniform pressure, so that completely satisfactory welding is obtained. Ribs 7 and 27 serve exclusively for heat transfer so that the center portion location of projections 32 forms a good connection and consequently a good heat transfer for the heat created in the stator of the machine. As can be gathered from FIG. 5, the free edges of legs 9 are only zonally provided with projections 32, i.e. where forces are introduced, e.g. at the two ends of the case of base profiles 12 and only in the center for the remaining ribs 7, 27, so as to achieve a good heat transfer. Ribs 12 form a portion of the foot and have a supporting function, so that the connection of the legs is made where the forces are introduced. An improved heat transfer is achieved in that projection 32 on the legs of the profiles have the same spacing, but are reciprocally displaced. More particularly, the projections 32 of one leg of a rib should be displaced by the half spacing of the projections on the other leg. This arrangement provides an improved distribution of the welding contact zones. The same arrangement can be used on adjacent profiles. Projections 32 can have different shapes and e.g. triangular projections with a height of about 8–16 mm are suitable.

FIG. 6 shows another foot profile 13, which has an intermediate leg 33 between the two legs 14, 15. Through the use of foot profiles 13, 33, it is possible to achieve different positions of the foot profiles 13, in that the fixing bores are arranged in displaced manner instead of being symmetrical, so that on replacing the two foot profiles 13 two different supporting positions of the electric machine are obtained.

FIG. 7 shows that foot profile 14 can also have a different, namely approximately S-configuration, but other profile shapes are also possible.

Apart from the base profiles 12 shown in FIGS. 2 and 3, it is possible to provide further base profiles 12 on the circumference of casing jacket 6. This gives the possibility of arranging foot profiles 13 in such a way that, as required, profile 27 with the stator and rotor terminals and therefore the terminal block can be positioned to the left, right or at the top.

As a result of the described construction of ribs 7, 27 of casing 1, a rational manufacture is achieved. The heat transfer is improved through the closed profiles. In addition, base profile 12 does not block any cooling ducts. Resistance projection welding is suitable in this case and it can also be carried out in the case of narrow cooling ducts. Uniform welding is ensured by the symmetrical profile shape, which leads to a uniform contact pressure and electric current. It is also pointed out that the foot 11 comprising base profile 12 and foot profile 13 makes it possible to achieve easy positioning, even without great working precision. The foot comprising base and foot profiles 12, 13 even makes it possible to press the foot profile from a metal sheet so as to make machining unnecessary, without having to accept disadvantageous imprecisions.

The weld which only extends over part of the profile length leaves a gap free alongside it, so that when casing 1 is dipped in a dye or paint bath, the dye or paint can penetrate everywhere and, consequently, additional corrosion protection is obtained.

While the fundamental novel features of the invention have been shown and described and pointed out, it will be understood that various substitutions and changes in the form of the details of the ebodiments shown may be made by those skilled in the art without departing from the concepts of the invention as limited only by the scope of the claims which follow.

What is claimed is:

1. A device for an air cooled electrical machine, said device comprising:
    an elongated cylindrical metal casing jacket having an axis extending in the direction of elongation, said jacket having oppositely directed outer and inner cylindrical surfaces;
    a plurality of spaced apart elongated metal cooling ribs disposed along the outer surface of the jacket, all of said ribs extending in the axial direction, each rib having two spaced apart legs having outer and inner edges, the outer edges of the two legs being connected by a straight web extending therebetween and outwardly displaced from the jacket, the inner edges of the legs being secured to the jacket, each rib in transverse cross section having a generally trapezoidal shape defined by the web and the separation between the legs being a maximum at the web and a minimum at the inner edges, two spaced apart ribs being bases; and
    two spaced apart feet, each foot being adjustably connected to a corresponding one of the base ribs.

2. The device of claim 1 wherein the ribs and casing jacket are composed of the same metal and the edges of the legs are welded to the outer surface of the casing.

3. The device of claim 1 wherein each base rib has a wider web than the other ribs, the said one rib enabling suitable arrangement of stator and rotor terminal and terminal blocks.

4. The device of claim 3 wherein several of the ribs are larger and/or thicker than the other ribs and are used as foot supports and/or used for enabling suitable arrangements of stator and/or rotor terminals and/or terminal blocks.

5. The device of claim 2 wherein a portion of the inner edge of each leg is provided with spaced apart forwardly extending projection points to which are secured to the jacket by projection welding.

6. The device of claim 5 wherein the said portion of the inner edge of each leg is disposed in the center of the inner edge and is spaced apart from the opposite ends of each edge.

7. The device of claim 5 wherein the said portion of the inner edge of each leg is divided into two like separated parts, each part being disposed in a corresponding one or two oppositely disposed end regions.

8. The device of claim 5 wherein all projections have the same spacing and wherein the projections on one leg are offset by one half spacing from the projections on the adjacent leg.

9. The device of claim 3 wherein the said base rib is thicker and arger than the other ribs.

* * * * *